United States Patent
Li et al.

(10) Patent No.: US 8,151,143 B2
(45) Date of Patent: Apr. 3, 2012

(54) METHOD AND APPARATUS OF PARTITIONED MEMORY DUMP IN A SOFTWARE SYSTEM

(75) Inventors: Ying Li, Beijing (CN); Jie Qiu, Beijing (CN); Qi Ming Teng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 12/108,815

(22) Filed: Apr. 24, 2008

(65) Prior Publication Data

US 2008/0270994 A1 Oct. 30, 2008

(30) Foreign Application Priority Data

Apr. 27, 2007 (CN) .......................... 2007 1 0104783

(51) Int. Cl.
*G06F 11/00* (2006.01)
(52) U.S. Cl. .......... 714/38.11; 714/25; 714/39; 711/173
(58) Field of Classification Search .................. None
See application file for complete search history.

(56) References Cited

U.S. PATENT DOCUMENTS

| 5,293,612 A | 3/1994 | Shingai |
| 7,424,589 B1 * | 9/2008 | Pliss et al. ...................... 711/170 |
| 2006/0041739 A1 | 2/2006 | Iwakura et al. |
| 2007/0174549 A1 * | 7/2007 | Gyl et al. ...................... 711/115 |

OTHER PUBLICATIONS

"KCRASH Part 1 : A User's Guide to Dump Analysis", UnixWare 7 Documentation, 2004, [http://uw714doc.sco.com/en/SM_dump/sect1.html].
"HP-UX 11i Version 1.5 System Crash Dump White Paper", Ch 1, Hewlett-Packard Company, 2001.
"Super-UX System Administrator's Guide", Ch4, NEC Corporation, 2000, [http://www.cptec.inpe.br/sx4/sx4man2/g1ah01e/chap4.html].
"System Dump Analyzer (SDA) Utility" in "QuickSpecs of HP OpenVMS Version 8.3 for Alpha and Integrity Servers", Hewlett-Packard Company, 2006.

* cited by examiner

*Primary Examiner* — Scott Baderman
*Assistant Examiner* — Jason Bryan
(74) *Attorney, Agent, or Firm* — Vazken Alexanian

(57) ABSTRACT

A method and apparatus of partitioned memory dump in a software system is provided, the apparatus comprising: a monitor for, during the execution of the software system, monitoring the memory allocations and deallocations of objects in the software system and according to the results of the monitoring, assigning the allocated objects in the software system into corresponding memory partitions, wherein the memory space of the software system is partitioned according to a given partitioning scheme; an event detector for detecting a triggering event of memory dump; and a dumper for dumping related memory partitions according to the detected triggering event of memory dump. Preferably, the apparatus further comprises an analyzer for analyzing the dumped information, and generating a new dump triggering event or a new partitioning scheme based on the analysis results.

35 Claims, 9 Drawing Sheets

Real Partitioning

Logical Partitioning

METHOD AND APPARATUS OF PARTITIONED MEMORY DUMP IN A SOFTWARE SYSTEM

CROSS-REFERENCE TO RELATED APPLICATIONS

This application claims priority under 35 U.S.C. §119 to Chinese Patent Application No. 200710104783.8 filed Apr. 27, 2007, the entire content of which is specifically incorporated by reference herein.

BACKGROUND OF THE INVENTION

1. Field of the Invention

The present invention generally relates to the computer field, particularly to memory dump, and more particularly to a method and apparatus of partitioned memory dump in a software system.

2. Description of Related Art

Memory dumping refers to copying the content of a main memory at a moment to a more durable medium such as a hard disk. It often occurs when a computer program aborts, and records the state of the working memory at this time for the computer program, and therefore can be used to diagnose and debug errors in the computer program.

For a software developer, software defects caused by inadvertent and/or malicious use of memory are very common, and such errors are difficult to diagnose and correct. A severe memory error would result in the halting of the whole software system. Therefore, a global knowledge of the use of the memory is very useful for software analysis and optimization. And for a system administrator, when a plurality of software packages are deployed in the same software runtime system, the memory contention possibly existing between the plurality of software packages will result in that the whole runtime system will be in a unstable state. Therefore, it is helpful for finding out and removing the memory contention among a plurality of software packages by using memory dumping to know the memory state of the runtime system at a certain moment. In conclusion, memory dumping is a very important method for determining and debugging memory problems, especially when the target system crashes and the erroneous code can not be located by other means.

The usual memory dumping is global dumping, i.e. copying out all the content in a memory space. However, such a global dumping has some defects as follows: the first is low efficiency, in that the global dumping needs to consume a lot of resources such as disk space, CPU time, I/O bandwidth, etc, and it is also very resource-consuming activity to analyze a very huge memory dump file. The second is that it is not feasible in some cases; for example, some critical tasks can not be stopped, and when resources such as the disk space, CPU time, I/O bandwidth, etc. are limited the global dumping cannot proceed either; the third is little necessity, in that in many cases, the developer has some judgment as to the range of memory space where the erroneous code is, and therefore only wants to dump the memory space of a narrower range; in addition, only dumping a small portion of the memory space each time also makes for locating the erroneous code more quickly and accurately.

Different from the above global memory dumping, partial memory dumping only dumps a specified portion of a memory space which may be very large. There are currently the following several technical solutions which support the partial memory dump.

The Digital UNIX operating system (see Digital UNIX Kernel Debugging, Part Number: AA-PS2TE-TE, March 1996 from the Digital Equipment Corporation) provides support to the partial and global memory dump, both of which include the physical memory content when the whole computer system crashes. But such a dump scheme is targeted at the whole computer system, and not to an application software system.

U.S. Pat. No. 5,293,612, entitled "Selective dump method and apparatus" discloses a method and apparatus for providing partial memory content dump. The method of the patent uses a page table, a TLB and another unfrozen processor to selectively dump a paged addressable memory. The dumped memory content is also targeted at the whole computer system. US patent application No. 20060041739A1, entitled "Memory dump generation with quick reboot" discloses a method for dumping a physical memory to a secondary storage device and decreasing the delay for rebooting the system. The memory dumping is performed when the system reboots. After the rebooting, the program images in the memory are scanned in an attempt to determine the cause of the system rebooting. If the cause of the reboot can be determined successfully, it will not be necessary to generate a dumped copy of the whole memory for fault analysis. Although the patent aims to lower the overhead of a global memory dumping as much as possible, the method of the patent essentially still needs to generate a global memory dump, and it only analyzes further the generated global memory dump when the system reboots so as to determine whether it is necessary to retain the SSD copy for further fault analysis. In addition, the memory content dumped by the method of the patent is the content of the physical memory and not the virtual memory. On a computer running a modern operating system, the layout of the physical memory is meaningless for an application system. Very professional system software knowledge will be required to analyze the dumped content of the physical memory, which can not be used by an average software developer. Furthermore, the method of the patent needs to reboot the whole operating system, and it is not an online memory dump method, and can not perform local memory dumping at any moment according to the instruction issued by a user.

"Analyzing system dumps using kcrash" in "UnixWare 7 Documentation" describes a tool kcrash for debugging an operating system kernel. The kcrash tool can implement partial memory dump, but the dumped content is that of a physical memory and its granularity is the physical page. Such a dumping is meaningful for the debugging of an operating system kernel, but it is not suitable for an application programmer, because physical memory addresses are worthless for any software system at the user level. In addition, the kcrash tool needs to run when the system is going to crash. Therefore, the technique on which the kcrash is based can not be converted and applied directly to the fault diagnosis of an application software system.

"HP-UX 11i Version 1.5 System Crash Dump White Paper" describes a tool which is approximately identical to the above-mentioned kcrash tool; it is used for fault diagnosis when an operating system crashes, and performs dumping for pages in the physical memory. Such a method and tool can not be used in the fault diagnosis of an application software system.

"SUPER-UX System Administrator's Guide" proposes a Dump Collection method which is also used for fault diagnosis at the time of a system level failure (i.e. operating system crash), and can perform dumping of byte granularity according to the physical memory address range. As mentioned above, such a method and tool can not be used for the fault diagnosis of an application software system either.

"System Dump Analyzer (SDA) Utility" in "QuickSpecs of HP OpenVMS Version 8.3 for Alpha and Integrity Servers" describes a system dump analysis tool provided by an HP OpenVMS multi-user operating system. The main function of the tool is to dump a portion of the main memory at the time of system failure. The dumped memory content can also be saved on a secondary storage medium. The tool provided by HP OpenVMS also performs dumping based on the physical memory content. As mentioned above, what such a dumping provides is the view of the memory for the operating system, and is not a view of the memory for an application software system. The method is still a kind of content copying based on physical addresses, and the dump information generated by it is meaningless for the fault diagnosis of an application software system; and the method can not be used for the dumping of the memory content of any software system directly or after a simple conversion.

Some JVM products support different types of memory dumping. For example, IBM JDK 1.4.2 for z/OS provides the following types of dump: JAVADUPM, SYSDUMP, CEE-DUMP, and HEAPDUMP (see IBM, IBM Developer Kit and Runtime Environment, Java 2 Technology Edition, Version 1.4.2, Diagnostic Guide, 8th edition, April 2006). But all these types of dumping are performed on the range of the whole virtual machine process, and a dumping on a portion of the memory content therein is not possible, so it is unhelpful for the debugging of application software running on the virtual machine.

In addition, most software systems can perform memory dumping when they are still alive (i.e., online dumping) by having a specialized and/or built-in dumping agent or by using special hardware. However, without these support, the dumping of the memory content is very difficult, even if not impossible. That is, such a dump method is software system specific and is not general.

It can be seen that in the art, there is a need for a general and application oriented partial memory dump method and apparatus.

SUMMARY OF THE INVENTION

In order to overcome the above mentioned defects in the prior art, there is proposed a method and apparatus of partitioned memory dump in a software system according to the present invention.

According to one aspect of the present invention, there is provided a method for dumping partitioned memory in a software system, comprising the steps of: during the running of the software system, monitoring memory allocations and deallocations of objects in the software system, wherein the memory space of the software system is partitioned according to a given partitioning scheme; according to the results of the monitoring, assigning the allocated objects in the software system into corresponding memory partitions; detecting a triggering event of memory dump; and dumping related memory partitions according to the detected triggering event of memory dump.

According to another aspect of the present invention, there is provided an apparatus for dumping partitioned memory in a software system, comprising: a monitor for, during the running of the software system, monitoring memory allocations and deallocations of objects in the software system and according to the results of the monitoring, assigning the allocated objects in the software system into corresponding memory partitions, wherein the memory space of the software system is partitioned according to a given partitioning scheme; an event detector for detecting a triggering event of memory dump; and a dumper for dumping related memory partitions according to the detected triggering event of memory dump.

The present invention can be embodied as a machine readable storage device, which has a computer program stored therein, the computer program having a plurality of code segments which can be executed by a machine to cause the machine to perform the steps of the above mentioned method.

The method and apparatus according to the present invention is mainly targeted at an application software system, and is not limited to an operating system; it can dump information meaningful for the operation analysis and debugging of the application software system, rather than dumping the information of physical memory addresses which is unhelpful for the operation analysis and debugging of the application software system. In addition, the method and apparatus according to the present invention is general, and can be used to dump any software system without need to reprogram the target software system, which needs a lot of work. In addition, the method and apparatus according to the present invention performs the dumping of partitions of the memory space of the target software system, not the dumping of the whole memory space, thereby making for searching for memory errors in the target software system in a divide-and-conquer manner or locating memory errors in the target software system by means of stepwise refinement.

BRIEF DESCRIPTION OF THE DRAWINGS

The appended claims describe novel features considered to be the characteristics of the present invention. However the invention itself and its preferred mode of use, other objects and advantages can be best understood by reference to the following detailed description of the illustrative embodiments when read in conjunction with the drawings, in which:

DETAILED DESCRIPTION OF THE PREFERRED EMBODIMENTS

Figure 1:
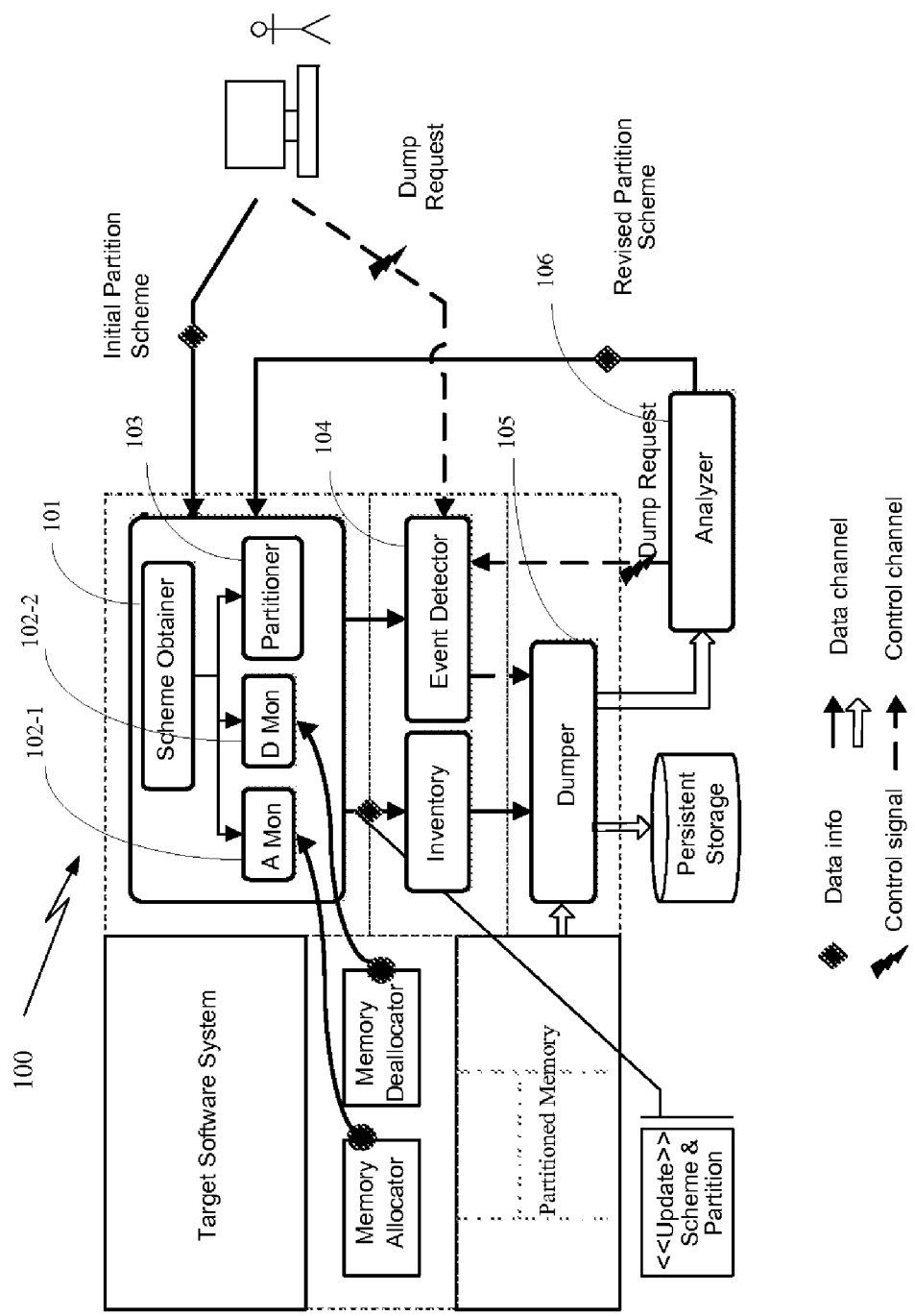
FIG. 1 shows a schematic diagram of an apparatus of partitioned memory dump according to a preferred embodiment of the present invention.

The embodiments of the present invention will be described hereinafter, it being understood, however, that the present invention is not limited to the described particular embodiments. On the contrary, it is construed that the present invention can be implemented and practiced using any combination of the features and elements hereinafter, regardless of whether they relate to different embodiments. The reference to features and elements in the present specification does not imply that a plurality or all of the features and elements that can be implemented using the present invention should be or are in any single embodiment of the present invention. On the contrary, the language relating to features and elements should be understood to mean that the specific features, characteristics or elements described in relation to embodiments are included in at least one embodiment of the present invention. Therefore, the discussion of features and elements and similar language throughout the specification may, but do not necessarily, refer to the same embodiment. In addition, a person skilled in the art may appreciate that the present invention can be implemented without one or more specific features and elements of certain embodiments. In other cases, other features and elements may be implemented in some embodiments, while these features and elements may not exist in any embodiment of the present invention. Therefore, the following aspects, features, embodiments and advantages are only for illustration and should not be construed as elements or limitations of the appended claims, unless otherwise indicated explicitly in the claims. Similarly, the reference to "the present invention" should not be interpreted as generalization of any inventive subject matter as disclosed herein, nor be regarded as elements or limitations of the appended claims, unless otherwise indicated explicitly in the claims.

The present invention proposes a method and apparatus of partitioned memory dump in a software system which, by parsing a given partitioning scheme, constructs corresponding memory partitions, and, by using a monitor embedded within the target software system to monitor the memory allocations and deallocations operations of objects during the execution of the target software system, records or updates the information of memory allocations and deallocations of the objects, and thereby updating the contents of the memory space partitions of the target software system, in order to dump specific partitions as needed when dumping, instead of the whole memory space of the target software system. In addition, various different partitioning schemes based on different criteria can be provided so as to construct different partitions of pertinence based on different partitioning schemes, thereby enabling analyzing the dumped information more effectively, and debugging memory errors during the execution of the target software system. In addition, based on the analysis results for the dumped information, a new dumping instruction may further be issued or a new partitioning scheme may be generated, thus diagnosing and debugging memory errors can be performed more quickly and effectively.

FIG. 1 is a schematic diagram showing a partitioned memory dump apparatus 100 according to a preferred embodiment of the present invention. As shown in the figure, the apparatus 100 of partitioned memory dump in a software system comprises: a partitioner 103 for partitioning the memory space of the software system based on a given partitioning scheme; a monitor 102 (102-1 and 102-2) for monitoring memory allocations and deallocations of the objects in the software system during the execution of the software system, and for assigning the allocated objects in the software system into corresponding memory partitions based on the monitoring results; an event detector 104 for detecting a triggering event of memory dump; and a dumper 105 for dumping related memory partitions according to the detected triggering event of memory dump.

In some embodiments of the present invention, the method of real partitioning of the memory space of the target software system is adopted. In such an embodiment using real partitioning, the partitioner 103 can first perform actual partitioning on the memory space of the target software system according to a given partitioning scheme, then during the execution of the target software system, the monitor 102 monitors the memory allocations and deallocations of the objects in the target software system and assigns different objects into corresponding partitions. In this real partitioning method, each partition can be a continuous area in the memory space of the target software system.

In other embodiments of the present invention, the method of logical partitioning of the memory space of the target software system is adopted. In such an embodiment using logical partitioning, the partitioner 103 does not perform actual partitioning on the memory space of the target software system, instead the monitor 102 assigns different objects into different logical partitions based on a certain partitioning scheme according to the memory allocations and deallocations of objects in the target software system it monitors. In such a logical partitioning method, each partition is not necessarily a continuous area in the memory space of the target software system. On the contrary, each partition may be a logical aggregation of the objects belonging to the partition, while the objects themselves are dispersed in the memory space of the target software system.

Figure 4:
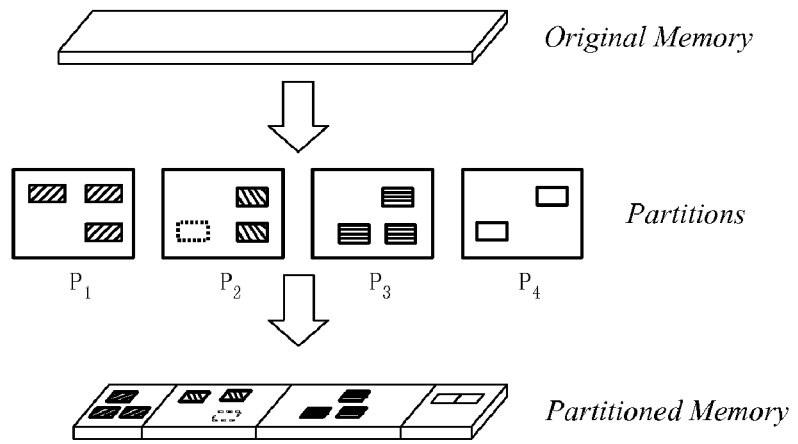
FIG. 4 shows an exemplary schematic diagram illustrating the principles of real partitioning and logical partitioning of the memory space of the target software system and the difference therebetween.
Figure 4:
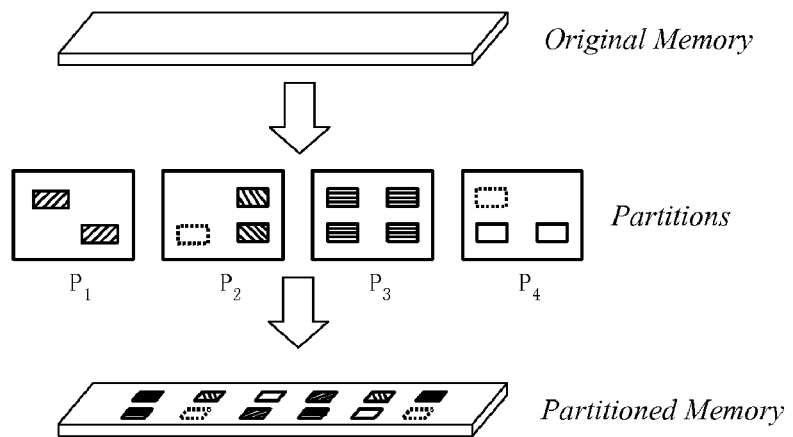

FIG. 4 shows an exemplary schematic diagram illustrating the principle of real partitioning and logical partitioning of the memory space of the target software system and the difference therebetween, in which the blocks of different patterns represent the objects belonging to different memory partitions in the target software system, and the dotted blocks represent those objects allocated and then deallocated in the memory space of the target software system.

In the preferred embodiment of the present invention, the monitor 102 is a module injected into the target software system. And the target software system can be a language runtime environment, such as a Java virtual machine; or can be a runtime system having an automatic memory management subsystem, such as an interpreter for a certain script language, for example, the execution engine of PHP scripts. More generally speaking, the target software system can be any software system in which a memory request can be intercepted, such as a software system written in C language, The final memory allocation/deallocations of such a software system are both implemented/realized by the C Run-Time library (CRT). A memory request of such an application software system can be intercepted.

The monitor 102 comprises an allocation monitor 102-1 (AMon) and a deallocation monitor 102-2 (DMon). The allocation monitor 102-1 is used to monitor runtime memory allocations of the running target software system. Its hooking position depends on the target software system. For example, when the target software system is a C program, the hooking position of AMon can be malloc( ), calloc( ) and realloc( ) functions in the C Run-Time library. When the target software system is a C++ program, the hooking positions of AMon can further include new( ) and new[ ] operators in the C++ Run-Time library. For the target software system having an automatic memory management function, the hooking position of AMon can be in an object allocation module in the system. For example, when the target software system is JVM or an application running thereon, the hooking position of AMon can be the JVMTI objectAllocate event.

The deallocation monitor 102-2 is used to monitor memory deallocation operations. Its hooking position also depends on the target system. For example, when the target software system is a C program, the hooking position of DMon can be free( )functions in the C Run-Time library. When the target software system is a C++ program, the hooking position of DMon can be delete( ) and delete[ ] operators in C++ Run-Time library. For the target software system having an automatic memory management function, the hooking position of DMon can be in a garbage collector in the target system. For example, when the target software system is JVM or an application running thereon, the hooking position of DMon can be the JVMTI objectFree event: void JNICALL ObjectFree (jvmtiEnv*jvmti_env, jlong tag).

Figure 2:
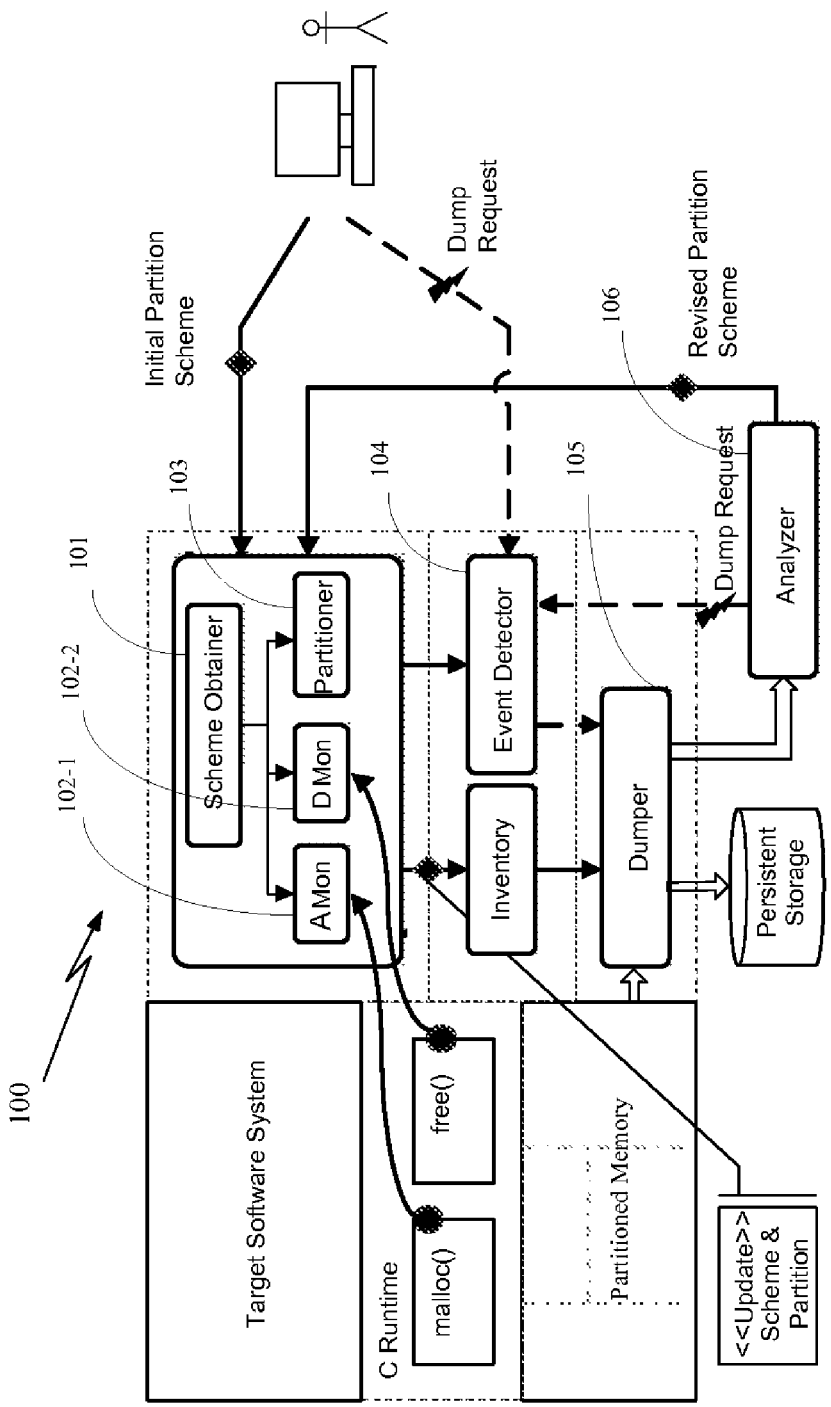
FIG. 2 shows a schematic diagram of an apparatus of partitioned memory dump in a software system according to a preferred embodiment of the present invention, when the target software system is one written in C language.

FIG. 2 shows a schematic diagram of an apparatus 100 of partitioned memory dump in a software system according to a preferred embodiment of the present invention, when the target software system is one using C language, and shows particularly the hooking positions malloc( ) and free( ) of the allocation monitor 102-1 and deallocation monitor 102-2.

Figure 3:
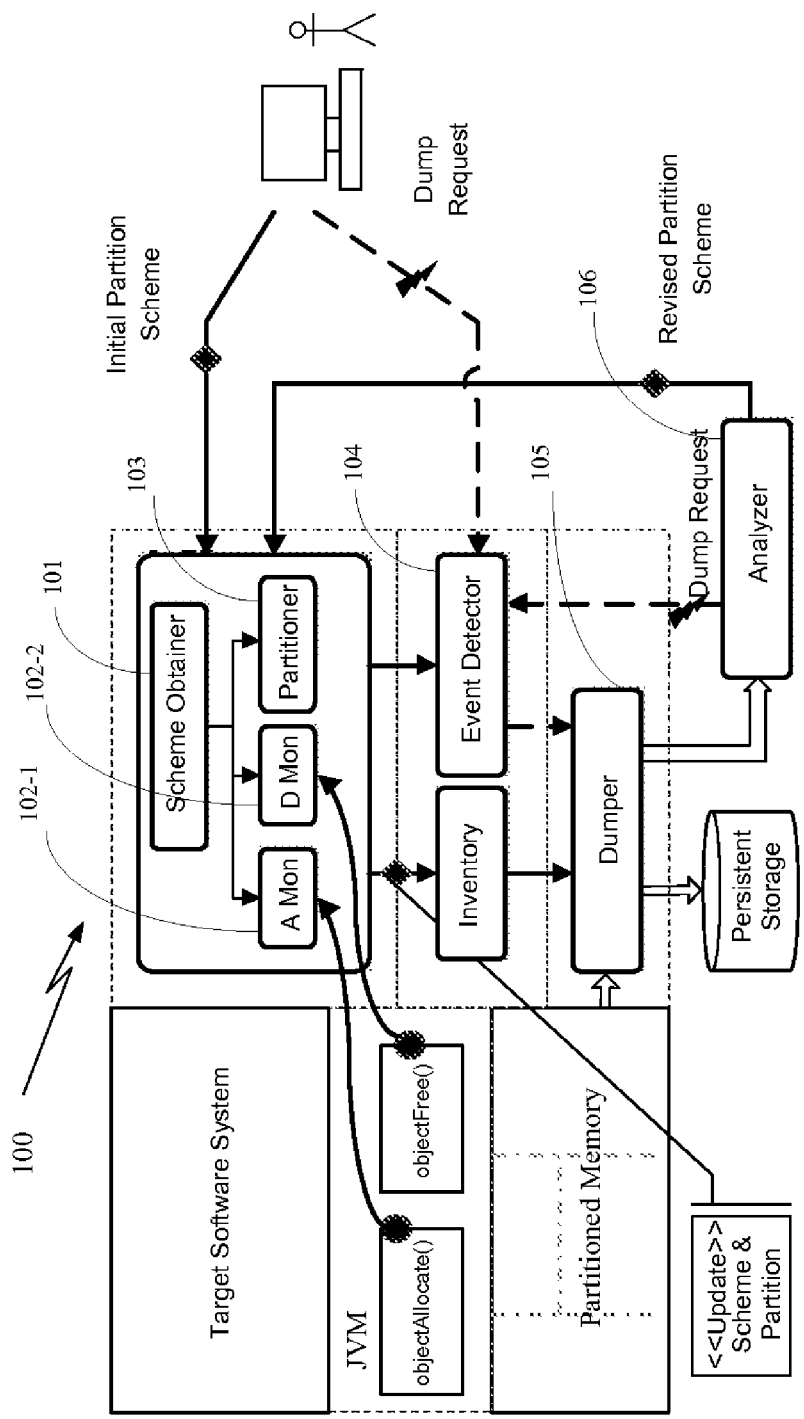
FIG. 3 shows a schematic diagram of an apparatus of partitioned memory dump in a software system according to a preferred embodiment of the present invention, when the target software system is a Java middleware/application.

FIG. 3 shows a schematic diagram of an apparatus 100 of partitioned memory dump in a software system according to a preferred embodiment of the present invention, when the target software system is Java middleware and/or application, and shows particularly the hooking positions objectAllocate( ) and objectFree( ) of the allocation monitor 102-1 and deallocation monitor 102-2.

In a preferred embodiment adopting logical partitioning, the logical partitioning is implemented in the following manner: the monitor 102 or the partitioner 103 can maintain an inventory (for example, in the main memory or in a persistent storage), and the monitor 102 records or updates the information on the monitored memory allocations and deallocations of objects in the target software system into the inventory. The inventory is a central catalogue recording the memory usage of the target software system during its execution. In a preferred embodiment, each time after an allocation or deallocation request is executed successfully, Amon or Dmon can record or update the inventory.

In an embodiment, the inventory comprises a number of records in the form of a tuple such as <owner, object, type, size, startaddress . . . >. Of course, the inventory can also adopt any other structure that can be used to record the information related to memory allocations and deallocations.

The monitor 102 or the partitioner 102 can use any method conceivable by a person skilled in the art to record and update the inventory. For example, each time a memory allocation of an object in the target software system is monitored, an entry of the information related to the allocation is recorded in the inventory; and each time a deallocation of the object is monitored, the entry can be deleted from the inventory, or alternatively the entry can be marked as deleted. In an embodiment, the inventory can also be obtained directly from the automatic memory management unit of the software system. For example, the garbage collector of a language runtime such as JVM already records a precise inventory on the information of memory allocations and deallocations, which can be used as an ideal source of the inventory of the present invention.

The following table shows an example of the inventory according to an embodiment of the present invention:

TABLE 1

| owner | obj | type | start | size | other info. |
|-------|-----|------|-------|------|-------------|
| A     | a   | I    | xxxx  | yy   |             |
| X     | q   | I    | xxyx  | rr   |             | in which, owner indicates the owner of the allocated object, obj indicates the ID of the object, type indicates the type of the object, start indicates the start address of the object in the memory space of the target software system, and size indicates the size of the object. Of course, the inventory can further comprises other information related to the allocations and deallocations of the object in the target software system in its memory space, such as the software module to which the object belongs, the transaction to which the object belongs, the source of the object, the creator of the object, etc.

Further, after the monitor 102 has recorded or updated in the inventory the information related to the memory allocations and the deallocations of objects in the target software system, the objects can further be assigned into corresponding logical partitions according to a certain partitioning scheme based on the different attributes of the objects allocated in the memory space of the target software system, as recorded in the inventory, such as the owners, sizes, types, etc. of the objects. Such an operation of assigning into logical partitions can be performed each time the monitor 102 records or updates the inventory based on a monitored memory allocation and deallocation operation of an object, that is, the logical partition is dynamically maintained at the time of object allocations and deallocations. In fact, such an operation of logically assigning into a partition can also be performed at the time when dumping is about to be performed, that is, after the event detector 104 detects the triggering event of memory dump, and before dumping is performed, the monitor 102, according to a partitioning scheme, arranges and classifies various objects recorded in the inventory based on their related attributes and assigns them into corresponding partitions. In particular, the objects can be assigned into different partitions by recording in the inventory or a separate table the allocated objects recorded in the inventory in association with the partitions to which they belong; alternatively, the objects can be assigned into different partitions by reordering and rearranging the rows of the inventory according to the partitioning scheme.

Although as mentioned above, in an embodiment of the present invention, such an operation of assigning the allocated objects of the target software system into corresponding logical partitions can be executed by the monitor 102, in other embodiments of the present invention, the operation can also be performed by a separate assigning module, or be performed by the partitioner 102, or by the dumper 105 as described below.

The apparatus 100 of partitioned memory dump in a software system according to an embodiment of the present invention further comprises an event detector 104 for detecting a triggering event of memory dump and triggering the dumper 105 to perform partitioned memory dumping according to the detected triggering event of memory dump. The triggering event of memory dump can be an exception raised during the program execution of the target software system, or a dump request or a signal received through inter-process communication (IPC). As an example, the exception during the program execution can be a null pointer reference, i.e. accessing a nonexistent or invalid address. These problems will first be detected and found by the processor, and then be reported to the operating system through an underlying exception handling mechanism. And the operating system will send a signal to the current application, i.e. the target software system of the present invention, so as to be processed by it. Thus, the event detector 104 in the apparatus 100 of partitioned memory dump in a software system according to an embodiment of the present invention can detect the signal, and regard it as a triggering event of memory dump, to trigger the dumper 105 to perform a memory dumping. In addition, in an application scenario where the method and apparatus according to the present invention is used by another debugging and diagnosis tool as a special support for memory error diagnosis, the triggering event of memory dump can be a memory dump request sent by the corresponding debugging and diagnosis tool in the form of IPC. The triggering event of memory dump can also be a dump request issued from a user and received from a user interface etc. In addition, the triggering event of memory dump can also be a re-dump request from an analyzer 106 in the apparatus according to an embodiment of the present invention as described below.

When the triggering event of memory dump detected by the event detector 104 is an exception raised during program execution, the event detector 104 can inform the dumper 105 to dump a related partition such as a partition related to the exception occurrence address. When the triggering event of memory dump detected by the event detector 104 is a memory dump request for example sent in the form of IPC, preferably the memory dump request can contain therein a specified partition to be dumped. The event detector 104 may extract the specified partition from the memory dump request and notify the dumper 105 of it. Alternatively, after the event detector 104 receives the triggering event of memory dump and notifies the dumper 105 of it, the dumper 105 may dump the memory partitions sequentially according to a given partitioning scheme, rather than obtaining the designation of the memory partition to be dumped from the triggering event of memory dump.

Figure 5:
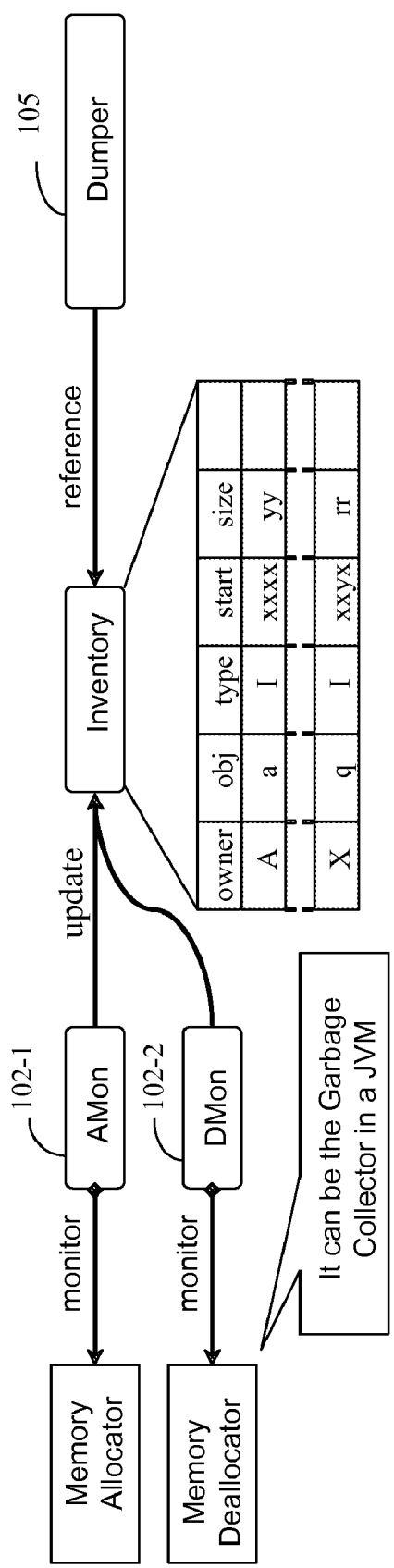
FIG. 5 shows a schematic diagram illustrating that a monitor records and updates an inventory and a dumper perform dumping according to the inventory in an apparatus of partitioned memory dump in a software system according to an embodiment of the present invention.

The apparatus 100 of partitioned memory dump in a software system according to an embodiment of the present invention further comprises a dumper 105, for dumping a related memory partition in the memory space of the target software system according to the triggering event of memory dump as detected by the event detector 104. The dumper 105 can dump the related memory partition into a persistent storage or any other specified place. In an embodiment of the present invention, the function of assigning the allocated objects in the target software system into corresponding partitions can be included in the dumper 105. Thus, after the event detector 104 detects the triggering event of memory dump and sends a dump instruction to the dumper 105, the dumper 105 can determine the objects contained in the logical partition to be dumped and their positions in the memory space of the target software system by referring to the inventory, and then dump these objects belonging to the logical partition in the memory space of the target software system to a specified persistent storage or other places. The dumper 105 can either first assign all the objects recorded in the inventory to different logical memory partitions and then dump a related memory partition, or preferably only search for and determine the objects belonging to a related memory partition in the inventory, and after determining all the objects belonging to the related memory partition, dump out the contents in the memory space of the target software system, of the objects in the partition. FIG. 5 schematically shows that the dumper 105 of the apparatus 100 of partitioned memory dump in a software system according to an embodiment of the present invention performs dumping by referring to the inventory recorded or updated by the allocation monitor 102-1 and the deallocation monitor 102-2 at any moment.

The apparatus according to the present invention can either be implemented in a single-processor system, or be implemented in a multi-processor system. When the apparatus according to the present invention is implemented in a single-processor system, it may comprise only one dumper 105, which can dump different partitions in the memory space of the target software system sequentially; or comprise a plurality of dumpers 105, which can dump different memory partitions independently. When the apparatus according to the present invention is implemented in a multi-processor system, it preferably comprises a plurality of dumpers, each of which dumps different memory partitions independently under the control of one processor.

Preferably, the apparatus 100 of partitioned memory dump in a software system according to an embodiment of the present invention further comprises a scheme parser 101 for obtaining a memory partitioning scheme and parsing the memory partitioning scheme so as to direct the memory partitioning operation. The partitioning scheme can be written or specified by a user. The partitioning scheme can be provided as a configuration file in any format. For example, the following is an exemplary segment of a partitioning scheme configuration file written in XML for the memory partitioning based on object sizes:

```
<partitions>
    <partition ID="1" name="Tiny" type="logical">
        <criteria>
            <variable name="object.size" />
            <condition operator="LE" />
            <metric value="4000" />
        </criteria>
    </partition>
    <partition ID="2" name="Normal" type="logical">
        <criteria>
            <variable name="object.size" />
            <condition operator="between" />
            <metric value1="4000" value2="64000" />
        </criteria>
    </partition>
    <partition ID="3" name="Big" type="logical">
        <criteria>
            <variable name="object.size" />
            <condition operator="GE" />
            <metric value="64000" />
        </criteria>
    </partition>
</partitions>
```

The above XML segment describes such a memory partitioning scheme: the memory is divided logically according to object sizes as follows: those smaller than 4000 bytes are reckoned in a Tiny partition (with the ID 1); those between 4000 and 64000 bytes are reckoned in a Normal partition (with the ID 2); and those greater than 64000 bytes are reckoned in a Big partition (with the ID 3).

The partitioner 103 will construct memory partitions according to the partitioning scheme. In a preferred embodiment of the present invention, the partitioning scheme is specified or written by a user and is provided to the scheme parser 101 so as to direct the partitioning operation of the partitioner 103. In other embodiments of the present invention, the partitioner 103 can have one or more built-in partitioning schemes, and the partitioner 103 will perform the partitioning operation according to the built-in partitioning scheme. That is, in such an embodiment of the present invention, the partitioning scheme is fixed, thus the apparatus of partitioned memory dump in a software system according to the embodiment of the present invention will have no scheme parser.

There may be a plurality of partitioning schemes used for assigning the objects in a software system into different memory partitions, such as a partitioning scheme based on generations, a partitioning scheme based on object sizes, a partitioning scheme based on transactions, a partitioning scheme based on the software architecture, a partitioning scheme based on security/trust, a partitioning scheme based on quality/confidence, a partitioning scheme based on user discretion, etc.

Figure 6:
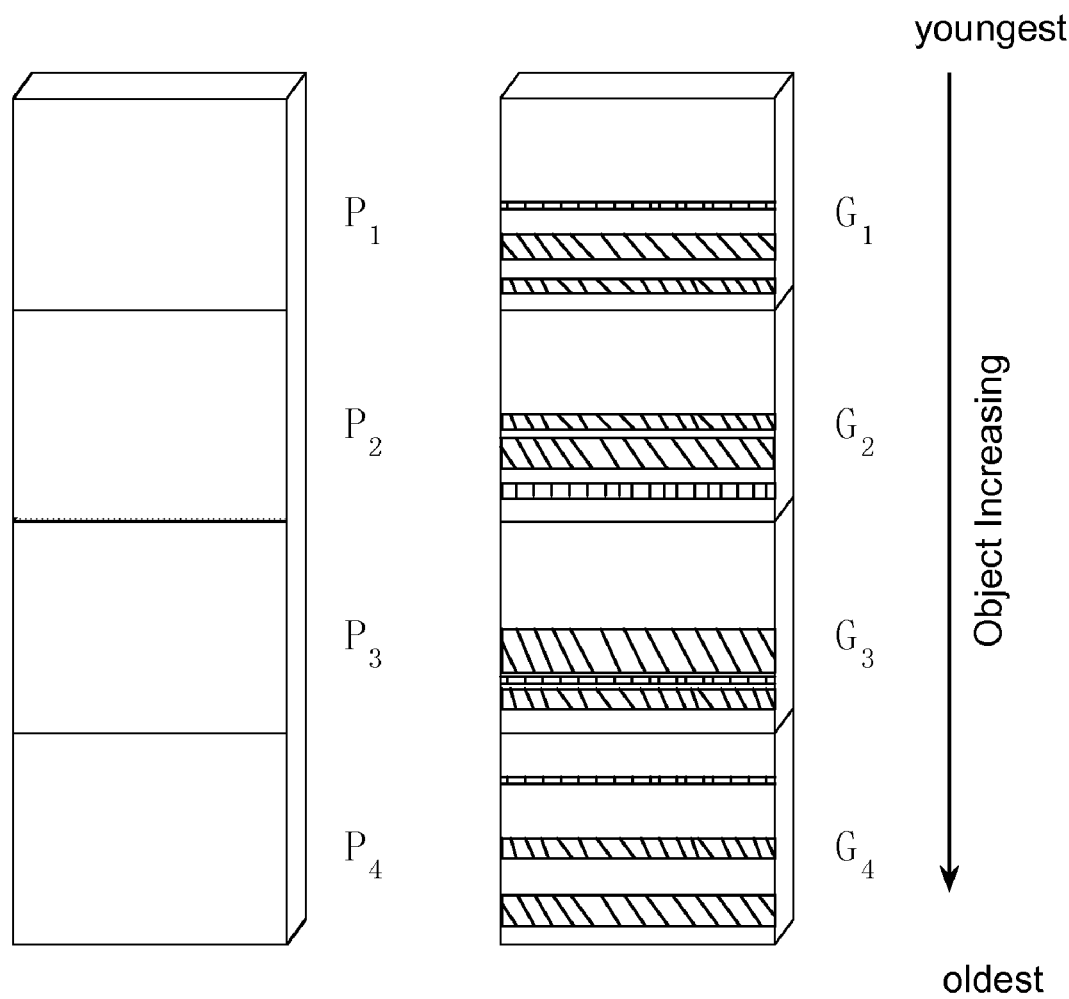
FIG. 6 shows a schematic diagram of an example of the partitioning scheme based on the generations of the allocated objects in a target software system according to an embodiment of the present invention.

A partitioning scheme based on generations refers to that objects in a software system are assigned to different partitions of different generations according to how long the objects in the software system has resided in the memory space of the software system, and when dumping the dumping is performed according to generations, such as one generation a time. Such a partitioning scheme is suitable for diagnosis of software errors, in which, when a software running exception triggers the partition dumping, the software code can be examined from near to far, beginning from the newest object in the memory space, so as to make for finding the cause of the software exception as soon as possible. FIG. 6 schematically shows an example of a partitioning scheme based on the generations of the allocated objects in the target software system according to an embodiment of the present invention.

Figure 7:
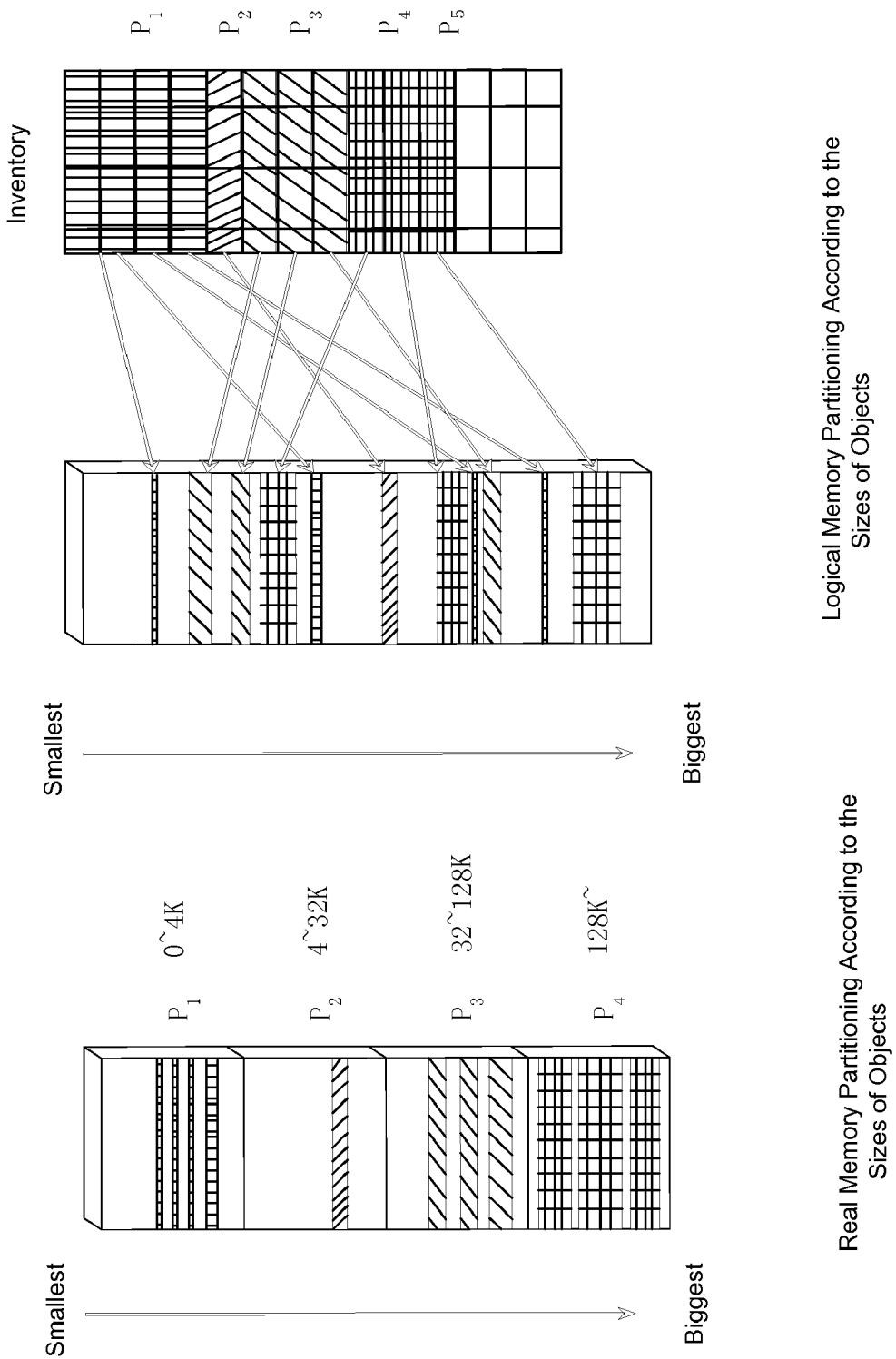
FIG. 7 shows a schematic diagram of the partitioning scheme based on the sizes of the allocated objects in a target software system according to an embodiment of the present invention.

A partitioning scheme based on sizes refers to that the allocated objects are assigned to different partitions according to the sizes of the objects in the software system. The memory dump performed according to the partitioning scheme based on sizes can be used to, for example, diagnose fast memory leak and slow memory leak differentially. FIG. 7 schematically shows an example of a partitioning scheme based on the sizes of the allocated objects in the target software system according to an embodiment of the present invention. The left part of the figure schematically shows a real memory partitioning based on object sizes, and the right part of the figure schematically shows a logical memory partitioning based on object sizes.

Figure 8:
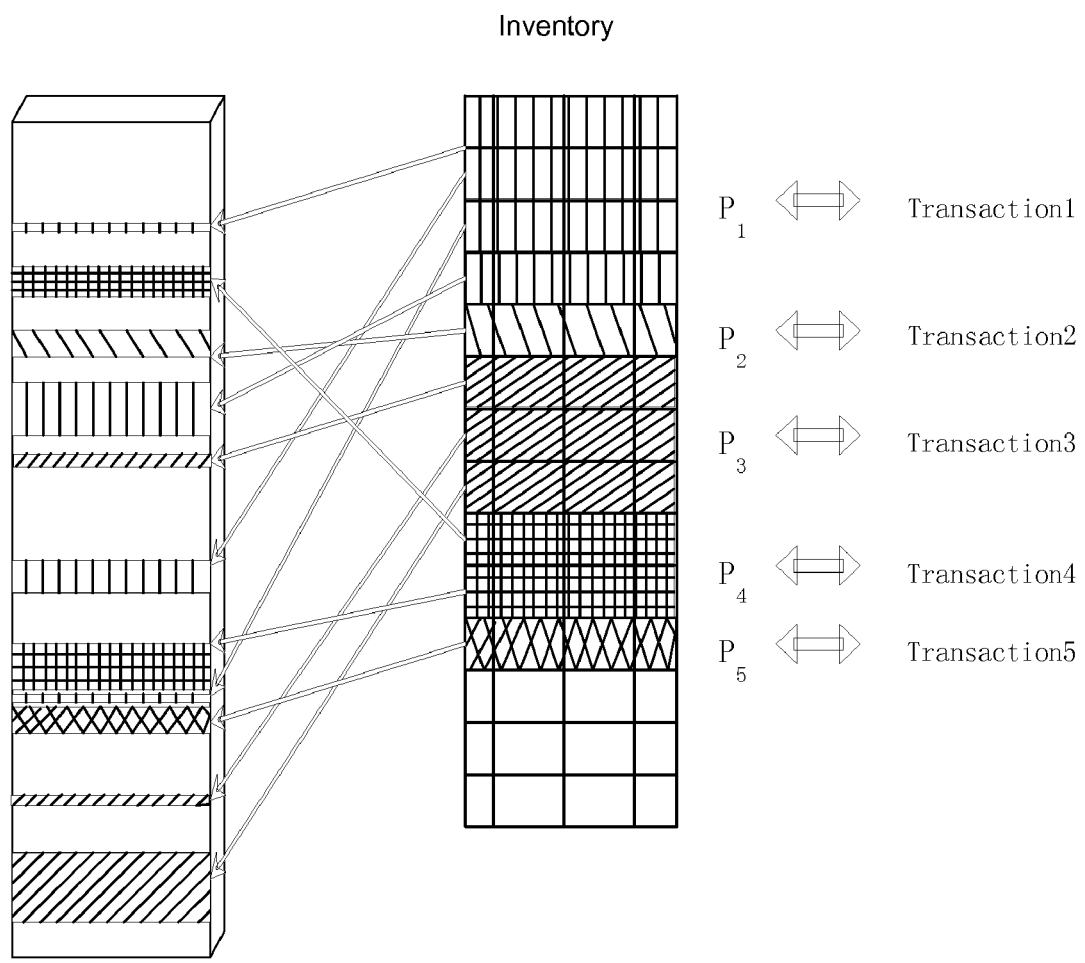
FIG. 8 shows a schematic diagram of the partitioning scheme based on the transactions to which the allocated objects in a target software system belong according to an embodiment of the present invention.

A partitioning scheme based on transactions refers to that the allocated objects are assigned to different partitions according to the transactions to which the objects in the software system belong, and it is suitable for dumping and diagnosis of a server software system. In a server software system, after a user established a connection with it, all the operations performed are generally regarded as within the same transaction, and are identified by a certain unique ID. In such a software system, through the partitioning scheme based on transactions, the memory contents in different partitions related to different users can be dumped out, thus enabling distinguishing and analyzing the interactions between different users and the server, which is often very helpful for diagnosing memory errors and even security attack, etc. FIG. 8 schematically shows an example of a partitioning scheme based on transactions to which the allocated objects in the target software system belong according to an embodiment of the present invention.

A partitioning scheme based on the software architecture refers to that the allocated objects are assigned to different partitions according to the software modules to which the objects in the software system belong. Such a partitioning scheme is suitable for, for example, finding quickly the cause of software errors when the software architecture is known.

A partitioning scheme based on security/trust refers to that the allocated objects are assigned to different partitions according to the code sources of the objects in the software system, such as their reliabilities. For example, the reliability of software downloaded from a network can be determined based on whether the signature of it is valid. The partition dumping according to such a partitioning scheme can be used to identify memory problems related to system security.

A partitioning scheme based on quality/confidence refers to that the allocated objects are assigned to different partitions according to the quality of the objects in the software system or the quality of the code itself of the modules to which they belong. The partition dump according to such a partitioning scheme can be used to identify memory problems related to code maturity and stability.

Obviously, the above partitioning schemes are only examples for illustrating and exemplifying the advantageous effects that the apparatus of the present invention may bring about, rather than limiting the present invention thereto. The apparatus 100 of partitioned memory dump in a software system according to an embodiment of the present invention can adopt any other partitioning scheme.

In the above embodiment of the present invention, the scheme parser 101 is used to parse the obtained memory partitioning scheme file and provide the parsing results to the partitioner 103 so as to direct the partitioner 103 to perform partitioning. And in other embodiments of the present invention, the scheme parser 101 can provide the obtained partitioning scheme file directly to the partitioner 103, which will perform the function of parsing the partitioning scheme file.

In an embodiment using real memory partitioning of the present invention, the partitioner 103 can perform different partitioning on the memory according to different partitioning schemes received from the scheme parser 101 or different parsing results for different partitioning schemes, and assign objects in the software system to various memory partitions. For example, in a case where the scheme parser 101 has obtained a partitioning scheme based on generations, the partitioner 103 can first divide the memory space of the target software system into different partitions corresponding to different generations according to the partitioning scheme, and then during the running process of the target software system, assign objects in the software system to corresponding partitions according to the generations to which they belong. For another example, in a case where the scheme parser 101 has obtained a partitioning scheme based on object sizes, the partitioner 103 can first divide the memory space of the target software system into memory partitions corresponding to different object sizes, and then assign the objects to be allocated into different partitions according to their sizes. For yet another example, in a case where the scheme parser 101 has obtained a partitioning scheme based on the software architecture, the partitioner 103 can first divide the memory space of the target software system into different memory partitions corresponding to different software modules according to the partitioning scheme, and then during the execution of the target software system, assign the objects to be allocated to different memory partitions according to the software modules to which they belong.

In the embodiment using logical memory partitioning of the present invention, the partitioner 103 can perform logical partitioning on the memory space of the target software system according to different partitioning schemes or different parsing results for different partitioning schemes from the scheme parser 101, and the monitor 102 or the partitioner 101, etc. assigns the allocated objects to corresponding logical partitions. In a preferred embodiment of the present invention, the function of logical partitioning the memory space of the target software system can be incorporated into the scheme parser 101. That is, in such an embodiment using logical partitioning, obtaining and/or parsing a partitioning scheme is regarded as performing a partitioning operation on the memory space of the target software system.

In particular, when the scheme parser 101 obtains a partitioning scheme from a user, it can provide the partitioning scheme or the parsing results for the partitioning scheme to the monitor 102, and the monitor 102 will monitor the allocations and deallocations of the objects in the target software system in its memory space, and record or update the information necessary for implementing the partitioning scheme into the inventory. That is, the structure of the inventory can be adjusted according to the partitioning schemes. For example, the inventory example shown by the table above records the owners, object names, types, start addresses and sizes of objects in the software system. This inventory can be used for a partitioning scheme based on object sizes. That is, when the scheme parser 101 has obtained a partitioning scheme based on object sizes, the monitor 102 will record or update such information as the object owners, object IDs, types, start addresses and sizes, etc. related to the monitored memory allocations and deallocations of objects into the inventory according to the partitioning scheme based on object sizes or the parsing results for the partitioning scheme from the scheme parser 101. Thus the allocated objects in the memory space of the target software system can be assigned into different partitions according to the information related to object sizes as recorded in the inventory. For another example, for a partitioning scheme based on generations, the monitor 102 can record or update such information as object owners, object IDs, types, start addresses, sizes and ages, etc. in the inventory, so as to enabling assigning the objects into partitions corresponding to different generations according to the object ages. And for a partitioning scheme based on transactions, the monitor 102 can record or update such information as object owners, object IDs, types, start addresses, sizes and transaction IDs to which the objects belong, etc. in the inventory, so as to enabling assigning the objects into partitions corresponding to different transactions according to the transactions to which the objects belonged.

Of course, it is also contemplated that the monitor 102 can record or update all the information related to the allocations and deallocations of objects in the memory space of the target software system in the inventory regardless of the partitioning schemes, and the monitor 102, the partitioner 103 or the dumper 105, etc. assigns the allocated objects in the memory space of the target software system into corresponding logical partitions according to the related information recorded in the inventory.

In addition, after the monitor 102 has recorded or updated the information related to the memory allocations and deallocations of objects in the target software system in the inventory, it further assigns the allocated objects in the memory space of the target software system into corresponding logical partitions according to the information related to the allocations and deallocations of the objects in the target software system, as recorded in the inventory. That is, the monitor 102 or the partitioner 103, etc. can assign various objects into corresponding logical partitions based on a given partitioning scheme according to the different attributes of the various objects allocated in the memory space of the target software system, as recorded in the inventory, such as the owners, sizes and types, etc. of the objects. For example, in a case where the scheme parser 101 obtains a partitioning scheme based on object sizes, the monitor 102 or the partitioner 103, etc. can assign the various objects into the logical partitions having corresponding size ranges, as specified in the partitioning scheme. For another example, in a case where the scheme parser 101 obtains a partitioning scheme based on the software architecture, the monitor 102 or the partitioner 103, etc. can assign the various objects to the logical partitions containing the software modules, as specified in the partitioning scheme, according to the software modules to which the allocated objects belong, as recorded in the inventory, and so on.

In a preferred embodiment of the present invention, the apparatus 100 of partitioned memory dump in a software system further comprise an analyzer 106 for analyzing the dumped memory partitions so as to trigger a new dumping, or form a new partitioning scheme and perform a new dumping according to the new partitioning scheme, thus enabling diagnosing more accurately the positions and sources of memory errors. Such a process of analyzing, triggering a new dumping or forming a new partitioning scheme can be repeated multiple times, until for example the sources of the memory errors are found. The analyzer 106 can analyze the dumped information using any method and apparatus. In a preferred embodiment of the present invention, the analyzer 106 is a graphical tool provided to a user so that the user can analyze the dumped information. The analysis results represent a further judgment of the positions and natures of the memory errors, so that the user can issue a new dump request directly to the event detector 104 by using the analyzer 106 or another device, the new dump request preferably comprising a specification of new memory partitions. In other embodiments of the present invention, it can also be contemplated that without user participation, the analyzer 106 analyzes the dumped information, and issues a new dump request to the event detector 104 according to the analysis results. The new dump request can be a request to dump a partition adjacent to the previously dumped partition or other related partitions or any other partitions.

In a preferred embodiment of the present invention, the analyzer 106 can form a new partitioning scheme according to the analysis results for the dumped information independently or under the participation of the user, and send the new partitioning scheme to the scheme parser 101, and the scheme parser 101 will provide the new partitioning scheme or the parsing results for the new partitioning scheme to the partitioner 103 or the dumper 105, etc., so that the partitioner 103 or the dumper 105, etc. can perform partitioning according to the new partitioning scheme or the parsing results for it, and after the event detector 104 detects a triggering event of memory dump, the dumper 105 will dump the partitions based on the new partitioning scheme.

Preferably, the partitioner 103 or the dumper 105 etc., after receiving the new partitioning scheme or the parsing results for it from the scheme parser 101, assigns the objects to different partitions directly based on the information related to the allocated objects in the software system, as currently recorded in the inventory, rather than waiting for the monitor 102 to monitor again the execution of the target software system, then to record and to update again into the inventory the information related to the monitored allocations and deallocations of the objects in the software system and then to assign the objects to different partitions based on this new information related to the allocated objects in the inventory. Of course, it is also contemplated that after the scheme parser 101 obtains a new partitioning scheme, while the new partitioning scheme or the parsing results for it is provided to the partitioner 103 or the dumper 105, etc., the new partitioning scheme or the parsing results for it is also provided to the monitor 102, and the monitor 102 monitors the execution of the target software system and records and updates in the inventory the information related to the allocations and deallocations of the objects in the software system, and necessary for implementing the new partitioning scheme, and then the partitioner 103 or the dumper 105, etc. performs partitioning according to the new partitioning scheme based on the new information related to the allocated objects, as recorded in the inventory, so that the dumper 105 can dump the new partitions in the new partitioning scheme.

Such a method of performing new a dumping or forming a new partitioning scheme based on the analysis of the dumped information make the stepwise or continuously refined positioning of memory errors possible, thus making for finding quickly the exact positions and sources of the memory errors. The new partitioning scheme can not only be based on a different type of criterion from that on which the previous partitioning scheme is based, but also can be based on a criterion which is of the same type as but more refined than that on which the previous partitioning scheme is based. The partition formed according to the new partitioning scheme not only can be adjacent to the partition formed according to the previous partitioning scheme, but also can be a part of the partition formed according to the previous partitioning scheme.

For example, the user can not determine the exact location of a memory error initially, and the cost for performing dump analysis on the whole memory is too high, so an analysis and diagnosis is performed by using a strategy of "divide and conquer". First a partitioning scheme of ⅛-⅞ is constructed, wherein what is dumped when dumping is the lowest ⅛ range of the whole memory. It is found by analyzing this range that the memory problem did not happen in this partition. Then it is decided to divide again the remaining ⅞ of the memory area so as to form a new scheme of ⅐-⁶⁄₇. This is an example of partitions being adjacent.

For another example, a user analyzes the dumped content of a first partitioning, and the dumped content covers all the memory allocations happened in a software module A. The analysis results hold that further refinement is needed to determine which submodule of A the specific position of the fault is in. Thus the user decides to form a new partitioning scheme, and performs a more refined division of the previous partition according to the composition of module A (for example, comprising A.1, A.2 and A.3). This is an example of a memory error diagnosis of the "stepwise refinement" type.

In the above the apparatus 100 of partitioned memory dump in a software system according to an embodiment of the present invention has been described. It should be noted that the structure of the apparatus as described above and shown in the drawings is only an example, and not a limitation to the apparatus 100 of partitioned memory dump in a software system of the present invention. In other embodiments of the present invention, the apparatus 100 of partitioned memory dump in a software system can have more, less or different modules and the relationships between the modules can be different. For example, as mentioned above, assigning the allocated objects in the target software system as recorded in the inventory to different logical partitions can be performed either by the monitor 102, or the partitioner 103, or the dumper 105 or a separate assigning module. In addition, in an embodiment using logical partitioning of the present invention, the function of the partitioner 103 can be incorporated into the scheme parser 101. That is, there is no separate partitioner 103 in the embodiment; or the above mentioned separate assigning module for assigning the allocated objects as recorded in the inventory to logical partitions can be referred to as the partitioner 103. The scheme parser 101, the monitor 102 and the partitioner 103 can be contained in a single module, which can also be referred to as the partitioner 103. That is, the functions of the scheme parser 101 and the monitor 102 can be included in the partitioner 103. The partitioner 103 can either be embedded in the target software system, or reside in an independent application such as a debugger, or exist as an independent apparatus. In addition in an embodiment of the present invention, there can be no scheme parser 101. That is, the apparatus of partitioned memory dump in a software system performs partitioning and dumping according to a built-in and fixed partitioning scheme. These variations are all within the spirit and scope of the present invention.

Figure 9:
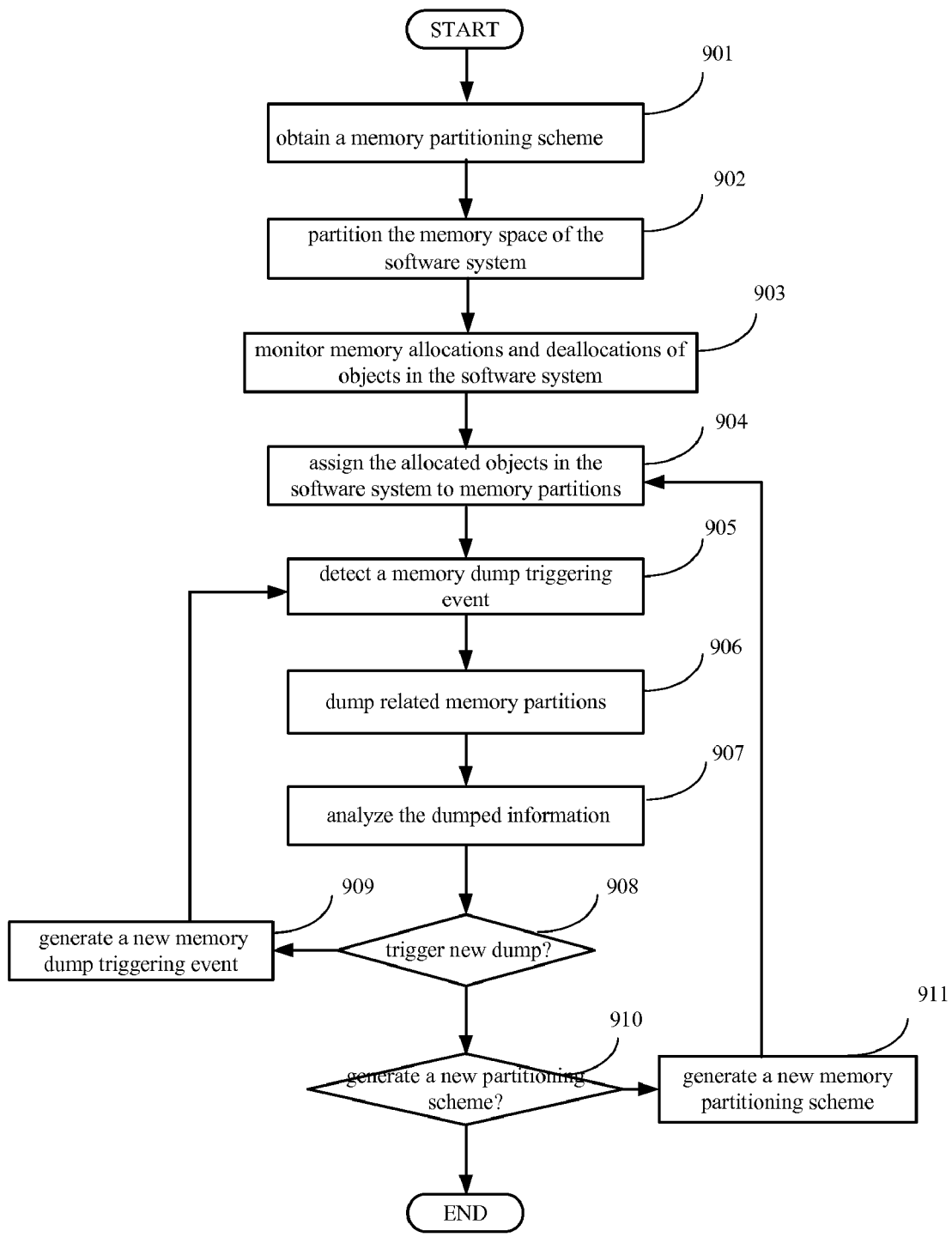
FIG. 9 shows a flowchart of a method of partitioned memory dump in a software system according to an embodiment of the present invention.

A method of partitioned memory dump in a software system according to an embodiment of the present invention will be described below with respect to FIG. 9. For the convenience of narration, this description is given mainly with respect to the apparatus of partitioned memory dump in a software system according to an embodiment of the present invention as described above and shown in FIG. 1; it should be noted, however, that the method of partitioned memory dump in a software system of the present invention can be performed by other apparatuses. As shown in the figure, the method comprises the following steps.

At step 901, a partitioning scheme is obtained. The step can be performed, for example, by the scheme parser 101 in the apparatus 100 of partitioned memory dump in a software system according to an embodiment of the present invention, for example. The memory partitioning scheme is used to direct memory partitioning operations, and it can be written or specified by a user. The partitioning scheme can be provided as a configuration file in any format, such as XML format. In certain embodiments of the present invention, the memory partitioning operation can be performed according to a built-in and fixed partitioning scheme, and thus in these embodiments of the present invention, there will be no step of obtaining the memory partitioning scheme. In an embodiment of the present invention, the obtained partitioning scheme can be provided directly to a subsequent step. In another embodiment of the present invention, the obtained memory partitioning scheme can also be parsed and the parsing results are provided to a subsequent step so as to direct such operations as recording and partitioning, etc.

There may exist many partitioning schemes for assigning objects in the software system to different memory partitions, such as a partitioning scheme based on generations, a partitioning scheme based on object sizes, a partitioning scheme based on transactions, a partitioning scheme based on the software architecture, a partitioning scheme based on security/trust, a partitioning scheme based on quality/confidence, a partitioning scheme based on user discretion, etc. Among them, the partitioning scheme based on generations refers to that objects in a software system are assigned to different partitions corresponding to different generations according to the time that the objects in the software system has existed in the memory space of the software system, and when dumping the dumping is performed according to generations, such as one generation a time. The partitioning scheme based on transactions refers to allocated objects are assigned to different partitions according to the transactions to which the objects in the software system belong, and it is suitable for the dumping and diagnosis of a server software system. The partitioning scheme based on sizes refers to that the allocated objects are assigned to different partitions according to the sizes of the objects in the software system. The partitioning scheme based on the software architecture refers to that the allocated objects are assigned to different partitions according to the software modules to which the objects in the software system belong. The partitioning scheme based on security/trust refers to that the allocated objects are assigned to different partitions according to the code sources of the objects in the software system, such as their reliability. The partitioning scheme based on quality/confidence refers to that the allocated objects are assigned to different partitions according to the quality of the objects in the software system or the code of the modules to which they belongs. Obviously, the above partitioning schemes are only examples for illustrating and exemplifying the advantageous effects that the method of the present invention may bring about, rather than limiting the present invention thereto. The method of partitioned memory dump in a software system according to an embodiment of the present invention can adopt any other partitioning scheme.

At step 902, the memory space of the target software system is partitioned based on the partitioning scheme. Such a partitioning not only can be a real portioning performed on the memory space of the target software system, but also can be a logical partitioning performed on the memory space of the target software system. In an embodiment using real partitioning of the method of the present invention, in the step 902, real partitioning is performed on the memory space of the target software system according to the given partitioning scheme, then during the execution of the target software system, different objects are assigned to corresponding partitions according to the monitored memory allocations and deallocations of objects in the target software system. In such a real partitioning method, each partition can be a continuous area in the memory space of the target software system. But in an embodiment using logical partitioning of the method of the present invention, in the step 902, no real partitioning is performed on the memory space of the target software system; rather, in the subsequent steps, after monitoring the memory allocations and deallocations of objects in the target software system, the different objects are attributed to different logical partitions according to a certain partitioning scheme. In such a logical partitioning method, each partition is not necessarily a continuous area in the memory space of the target software system; on the contrary, each partition can be a logical combination of various objects belonging to the partition distributed in the memory space of the target software system.

At step 903, during the execution of the target software system, the memory allocations and deallocations of objects in the software system are monitored. The monitoring operation can be performed, for example, by the monitor 102 in the apparatus 100 of partitioned memory dump in a software system according to an embodiment of the present invention. In a preferred embodiment of the present invention, the monitoring operation is performed by a monitor 102 module embedded in the target software system by intercepting the memory allocations and deallocations in the target software system. In a preferred embodiment of the present invention, the monitor 102 comprises an allocation monitor 102-1 (AMon) for monitoring memory allocation operations of the target software system during runtime, and a deallocation monitor 102-2 (DMon) for monitoring memory deallocation operations of the target software system during runtime. The hooking positions of the AMon and DMon in a target software system depends on the type of the target software system. Fr example, when the target software system is a C program, the hooking position of AMon can be malloc( ), calloc( ) and realloc( ) functions in the C Run-Time library, and the hooking position of DMon can be free( ) functions in the C Run-Time library. When the target software system is a C++ program, the hooking position of AMon can be new( ) and new[ ] operators in the C++ Run-Time library, and the hooking position of DMon can be the delete( ) and delete[ ] operators in C++ Run-Time library. For a target software system having an automatic memory management subsystem, the hooking position of AMon can be in an object allocation module in the system, and the hooking position of DMon can be in a garbage collector in the system. For example, when the target software system is a JVM or an application running thereon, the hooking position of AMon can be the JVMTI objectAllocate event, and the hooking position of DMon can be the JVMTI objectFree event. That is, the monitor 102 can monitor memory allocation and deallocation operations by monitoring the invocation of these functions, operators, events, etc.

At step 904, the monitored, allocated objects in the software system are assigned to different memory partitions. The assigning operation can be performed, for example, by the monitor 102, partitioner 103, dumper 105 or a separate assigning module in the apparatus 100 of partitioned memory dump in a software system according to an embodiment of the present invention.

In the embodiment using real partitioning of the present invention, the partitioner 103 first performs real partitioning on the memory space of the target software system, then assigns different objects to different partitions according to the partitioning scheme as obtained at step 901, based on the memory allocations and deallocations of objects in the target software system as monitored by the monitor 102. In such a real partitioning method, each partition is a continuous area in the memory space of the target software system.

In the embodiment using logical memory partitioning of the present invention, the partitioner 103 does not perform real partitioning on the memory space of the target software system, instead it assigns different allocated objects to different logical partitions according to the partitioning scheme as obtained at step 901, based on the memory allocations and deallocations of the objects in the target software system as monitored by the monitor 102. In such a logical partitioning method, each partition is not necessarily a continuous area in the memory space of the target software system; on the contrary, each partition can be a logical combination of various objects belonging to the partition distributed in the memory space of the target software system.

In a preferred embodiment, the logical partitioning is implemented in the following way: an inventory can be maintained, for example, in a main memory or a persistent storage, and the monitor 102 will record or update the information related to the monitored memory allocations and deallocations of objects in the target software system into the inventory. The inventory is a central catalogue for recording the memory usage of the target software system during its execution. In a preferred embodiment, each time after an allocation request or a deallocation request is executed successfully, the Amon or Dmon can record or update the inventory. In an embodiment, the inventory can also be obtained directly from an automatic memory management unit of the software system. For example, a garbage collector in the runtime of a language such as a JVM already records a precise inventory of the information related to memory allocations and deallocations, which can be used as an ideal source of the inventory of the present invention.

The memory can be partitioned logically by referring to the information related to the memory allocations and deallocations of objects in the target software system as recorded in the inventory. That is, the various objects can be logically assigned to different partitions according to, for example, the partitioning scheme as obtained at step 901, based on the different attributes of the various objects allocated in the memory as recorded in the inventory, such as the owners, sizes and types, etc. of the objects. Such a logical partitioning operation can be performed each time when the monitor 102 records or updates the inventory according to the monitored memory allocation and deallocation operations of objects. That is, the logical partitioning is maintained dynamically at the time of the allocations and deallocations of the objects. It is also be contemplated to perform a logical partitioning operation when about to dump. That is, before the dumping, according to a partitioning scheme, various objects as recorded in the inventory are arranged and classified according to their related attributes and are assigned to different partitions. In addition, all the objects as recorded in the inventory can first be assigned to different memory partitions and then the corresponding memory partitions can be dumped; or preferably, only the objects belonging to the relevant memory partitions can be searched for and identified, and after identifying all the objects belonging to the relevant memory partitions, the contents of the objects in the partitions in the memory space of the target software system can be dumped. The objects can be assigned to different partitions by recording into the inventory or a separate table the allocated objects as recorded in the inventory in association with the partitions to which they belong; alternatively, the various objects can be assigned to different partitions by reordering and rearranging the rows in the inventory according to the partitioning scheme, and so on.

In particular, the monitor 102 can, during monitoring of the execution of the target software system, monitor the allocations and deallocations of objects in the target software system in their memory space, and record or update the information necessary for implementing the partitioning scheme in the inventory. Of course, it is also contemplated to record or update in the inventory all the information related to the allocations and deallocations of objects in the target software system in the memory space of the target software system regardless of the partitioning scheme, and partition the allocated objects in the target software system only according to the received partitioning scheme and the related information recorded in the inventory. Thus, the allocated objects in the memory space of the target software system can be assigned logically to different partitions according to the partitioning scheme as obtained at step 901 and the information related to allocations and deallocations of the objects as recorded in the inventory.

At step 905, a triggering event of memory dump is detected. The detecting operation can be performed, for example, by the event detector 104 in the apparatus 100 of partitioned memory dump in a software system according to an embodiment of the present invention. The triggering event of memory dump can be an exception during the execution of the target software system, or a dump request or signal received through inter-process communication (IPC). As an example, the exception during the program running can be, for example, a null pointer reference, i.e. accessing a nonexistent address or invalid address. In addition, in an application scenario where the method of the present invention as special support for memory error diagnosis is used by another debugging and diagnosis tool, the triggering event of memory dump can be a memory dump request sent from the corresponding debugging and diagnosis tool in the form of IPC. The triggering event of memory dump can also be a dump request from a user received from a user interface, etc. In addition, the triggering event of memory dump can also be a new dump request based on the analysis of the dumped information.

When the triggering event of memory dump as detected by the event detector 104 is an exception raised during the runtime, the event detector 104 can inform the dumper 105 to dump a related partition, such as a partition related to the exception occurrence address. When the triggering event of memory dump as detected by the event detector 104 is, for example, a memory dump request sent in the form of IPC, preferably the memory dump request can include a specified partition to be allocated. The event detector 104 can extract the specified partition information from the memory dump request and inform the dumper 105 of it. As an alternative, after the event detector 104 receives the triggering event of memory dump and informs the dumper 105 of it, the dumper 105 can sequentially dump memory partitions according to a given dump scheme, rather than obtaining the designation of the memory partition to be dumped from the triggering event of memory dump.

At step 906, the related memory partitions are dumped according to the detected triggering event of memory dump. The dumping operation can be performed, for example, by the dumper 105 in the apparatus 100 of partitioned memory dump in a software system according to an embodiment of the present invention. The related memory partitions can be dumped to a persistent storage or any other specified places. In an embodiment of the present invention, there is no separate assigning step, the assigning step being incorporated in the dumping step. Therefore, in the dumping step, the memory partitions to be dumped, i.e. the objects contained in the memory partitions to be dumped and their locations in the memory space of the target software system, can be determined by referring to the inventory, and then these objects belonging to the logical partitions in the memory space of the target software system can be dumped to a specified permanent storage or another place.

The method of the present invention can be implemented either in a single-processor system or in a multi-processor system. When the method of the present invention is implemented in a single-processor system, one dumper 105 can sequentially dump different partitions in the memory space of the target software system; or a plurality of dumpers 105 can dump different memory partitions independently. When the method of the present invention is implemented in a multi-processor system, preferably a plurality of dumpers can dump different memory partitions independently under the control of different processors.

In a preferred embodiment of the present invention, the method of partitioned memory dump in a software system further comprises step 907 of analyzing the dumped information so as to trigger a new dumping at step 909 according to the judgment at step 908, or to form a new partitioning scheme at step 911 according to the determination at step 910 and subsequently dump according to the new partitioning scheme, in order to diagnose the position and source of a memory error more accurately. Such a process of analyzing, triggering new dumping or forming a new partitioning scheme can be repeated multiple times, until for example the source of the memory error is found. The dumped information can be analyzed using any method or apparatus. In a preferred embodiment of the present invention, the analyzer 106 in the form of a graphical tool is provided to the user so that the user can analyze the dumped information. The analysis results are further determination of the position and nature of the memory error, so that the user can generate a new dump request at step 909 and send the new dump request directly to the event detector 104 through the analyzer 106 or by other means, the new dump request preferably including the designation of the new memory partition. In other embodiments of the present invention, it is also contemplated that without user participation, the analyzer 106 analyzes the dumped information, and issues a new dump request to the event detector 104 according to the analysis results. The new dump request can be a request to dump a partition adjacent to the previously dumped partition or other related partitions or any other partitions.

In a preferred embodiment of the present invention, in step 911, the analyzer 106 can form a new partitioning scheme according to the analysis results for the dumped information independently or under the participation of the user, and return to step 904 so as to perform new partitioning and dumping operations on the new partitioning scheme.

Preferably, the partitioner 103 or the dumper 105 etc., after receiving the new partitioning scheme or the parsing results for it, assigns the objects to different partitions directly based on the information related to the allocated objects in the software system as recorded in the current inventory, rather than waiting for the monitor 102 to monitor again the running of the target software system, and to record or to update in the inventory the information related to the monitored allocations and deallocations of objects in the software system, and then assigning the objects to different partitions based on this new information related to the allocated objects in the inventory. Of course, it is also contemplated that after obtaining a new partitioning scheme, while providing the new partitioning scheme or the parsing results for it to the partitioner 103 or the dumper 105, etc., the new partitioning scheme or the parsing results for it is also provided to the monitor 102, the monitor 102 monitors the execution of the target software system and records or updates in the inventory the information related to the allocations and deallocations of objects in the software system, necessary for implementing the new partitioning scheme, and the partitioner 103 or the dumper 105, etc. performs partitioning according to the new partitioning scheme based on the new information related to the allocated objects, as recorded in the inventory, so that the dumper 105 can dump the new partitions in the new partitioning scheme.

Such a method for performing new dumping or forming a new partitioning scheme according to the analysis of the dumped information enable the stepwise or continuously refined positioning of memory errors, so as to make for finding the exact position and source of the memory errors. The new partitioning scheme can be either based on a criterion of a different class from that on which the previous partitioning scheme was based, or based on a criterion of the same class as but more refined than that on which the previous partitioning scheme was based. The partition formed according to the new partitioning scheme not only can be adjacent to the partition formed according to the previous partitioning scheme, but also can be a part of the partition formed according to the previous partitioning scheme. For example, in one case, the user can first construct a partitioning scheme of ⅛-⅞, dump the lowest ⅛ range of the whole memory when dumping, and then divide again the remaining ⅞ of the memory area so as to form a new scheme of ⅐-⁶⁄₇. In another case, the user can dump all the memory allocations occurring in a software module A during the first partition dumping, and then perform a more refined division on the previous partition according to the composition of module A (for example, comprising A.1, A.2 and A.3).

In the foregoing, a method of partitioned memory dump in a software system according to an embodiment of the present invention is described. It should be noted that the method as described above and shown in FIG. 9 is only an example, and not limitation to the method of partitioned memory dump in a software system of the present invention. In other embodiments of the present invention, the method may have more, less or different steps, and some of the steps can be combined into a single step or subdivided into more steps, and some of the steps can be performed in different order or in parallel. For example, in an embodiment of the present invention, there can be no separate partitioning step 902; on the contrary, the partitioning step 902 can be included in step 901 of obtaining and/or parsing a memory partitioning scheme; that is, the obtaining and/or parsing the memory partitioning scheme can be regarded as partitioning of the memory space of the target software system. The partitioning step 902 can also be included in the assigning step 904; that is, assigning the allocated objects in the memory space of the target software system to corresponding partitions is regarded as logical partitioning of the memory space; or in other words, the partitioning step and the assigning step are performed simultaneously, and are referred to together as a partitioning step. The step 901 for obtaining a partitioning scheme, the partitioning step 902, the monitoring step 903 and the assigning step 904 can also be referred to together as a partitioning step. For another example, the monitoring step can further comprise the step of recording or updating in the inventory the monitored information related to the memory allocations and deallocations of objects in the target software system. Alternatively, the recording step can also be included in the assigning step. For yet another example, the assigning step can also be included in the dumping step; i.e., the assigning operation is performed when dumping, thus without a separate assigning step, and so on. All of these variations are within the spirit and scope of the present invention.

The so-called object herein refers to an entity having an independent semantics for an application. For example, a data structure, a function, a variable, etc. in a structured programming language, as well as an instance of a certain class in an object-oriented language, etc. can all be referred to as an object.

The present invention can be implemented in software, hardware or a combination of software and hardware. The present invention can be implemented in a centralized mode in a computer system or in a distributed mode wherein different elements are distributed over a number of interconnected computer systems. Any computer system or another device suitable for performing the method described herein is applicable. A typical combination of software and hardware can be a general purpose computer system having a computer program, the program, when being loaded and executed, controlling the computer system to cause the system to execute the method described herein. The present invention can also be embodied in a computer program product, which comprises all the features enabling the methods described herein to be implemented, and when being loaded on a computer system, can perform these methods.

While the present invention is shown and described with respect to the preferred embodiment particularly, a person skilled in the art should understand that various changes in form and detail can be made to it without departing from the spirit and scope of the present invention.

We claim:

1. A method for dumping partitioned memory in a software system, comprising the steps of:

during execution of the software system, monitoring memory allocations and deallocations of objects in the software system, wherein a memory space of the software system is partitioned according to a given partitioning scheme;
according to results of the monitoring, assigning the allocated objects in the software system into corresponding memory partitions;
detecting a triggering event of memory dump;
dumping related memory partitions according to the detected triggering event of memory dump;
analyzing dumped information; and
generating a new triggering event of memory dump based on results of the analysis,
wherein the step of detecting the triggering event of memory dump comprises detecting the new triggering event of memory dump.

2. The method according to claim 1, further comprising a step of obtaining the partitioning scheme and a step of parsing the partitioning scheme;
wherein the step of partitioning the memory space of the software system according to a given partitioning scheme comprises partitioning the memory space of the software system based on results of the parsing.

3. The method according to claim 1, further comprising the steps of:
analyzing dumped information; and
generating a new partition scheme based on results of the analysis;
wherein the memory space of the software system is partitioned according to the new partitioning scheme.

4. The method according to claim 1, wherein the steps in the method are repeated in loops.

5. The method according to claim 1, wherein the memory partitions are real memory partitions.

6. The method according to claim 1, wherein the memory partitions are logical memory partitions.

7. The method according to claim 6, wherein the step of assigning the allocated objects in the software system into corresponding memory partitions according to results of the monitoring comprises the steps of:
recording and updating in an inventory information related to the monitored memory allocations and deallocations of objects in the software system; and
assigning the allocated objects in the software system to logical memory partitions according to the information as recorded in the inventory.

8. The method according to claim 7, wherein the step of recording and updating in an inventory the information related to the monitored memory allocations and deallocations of objects in the software system further comprises the step of:
recording and updating in the inventory the information related to the monitored memory allocations and deallocations of objects in the software system, necessary for implementing the partitioning scheme.

9. The method according to claim 1, wherein the triggering event comprises any one of a program exception and a dump request.

10. An apparatus for dumping partitioned memory in a software system, comprising:
a monitor for, during execution of the software system, monitoring memory allocations and deallocations of objects in the software system and according to results of the monitoring, assigning the allocated objects in the software system into corresponding memory partitions, wherein a memory space of the software system is partitioned according to a given partitioning scheme;
an event detector for detecting a triggering event of memory dump;
a dumper for dumping related memory partitions according to the detected triggering event of memory dump, and
an analyzer for analyzing dumped information, and for generating a new triggering event of memory dump based on results of the analysis;
wherein the event detector is implemented on a processor configured to detect the new triggering event of memory dump.

11. The apparatus according to claim 10, further comprising a scheme parser for obtaining the partitioning scheme, and for parsing the partitioning scheme; and
a partitioner is configured to partition the memory space of the software system based on results of the parsing.

12. The apparatus according to claim 10, further comprising an analyzer for analyzing dumped information, and for generating a new memory partitioning scheme based on results of the analysis,
wherein the memory space of the software system is partitioned according to the new partitioning scheme.

13. The apparatus according to claim 10, wherein the memory partitions are real memory partitions.

14. The apparatus according to claim 10, wherein the memory partitions are logical memory partitions.

15. The apparatus according to claim 14, wherein the monitor is further configured to:
record and update in an inventory information related to the monitored memory allocations and deallocations of objects in the software system; and
assign the allocated objects in the software system to logical memory partitions according to the information as recorded in the inventory.

16. The apparatus according to claim 15, wherein the monitor is further configured to:
record and update in the inventory the information related to the memory allocations and deallocations of objects in the software system, necessary for implementing the partitioning scheme.

17. The apparatus according to claim 10, wherein the triggering event comprises any of a program exception and a dump request.

18. A method for dumping partitioned memory in a software system, comprising the steps of:
during execution of the software system, monitoring memory allocations and deallocations of objects in the software system, wherein a memory space of the software system is partitioned according to a given partitioning scheme;
according to results of the monitoring, assigning the allocated objects in the software system into corresponding memory partitions;
detecting a triggering event of memory partitions;
dumping related memory partitions according to the detected triggering event of memory dump;
analyzing dumped information; and
generating new partition scheme based on results of the analysis;
wherein the memory space of the software system is partitioned according to the new partitioning scheme.

19. The method according to claim 18, wherein the steps in the method are repeated in loops.

20. The method according to claim 18, further comprising a step of obtaining the partitioning scheme and a step of parsing the partitioning scheme;

wherein the step of partitioning the memory space of the software system according to a given partitioning scheme comprises partitioning the memory space of the software system based on results of the parsing.

21. The method according to claim 18, wherein the steps in the method are repeated in loops.

22. The method according to claim 18, wherein the memory partitions are real memory partitions.

23. The method according to claim 18, wherein the memory partitions are logical memory partitions.

24. The method according to claim 23, wherein the step of assigning the allocated objects in the software system into corresponding memory partitions according to results of the monitoring comprises the steps of:
   recording and updating in an inventory information related to the monitored memory allocations and deallocations of objects in the software system; and
   assigning the allocated objects in the software system to logical memory partitions according to the information as recorded in the inventory.

25. The method according to claim 24, wherein the step of recording and updating in an inventory the information related to the monitored memory allocations and deallocations of objects in the software system further comprises the step of:
   recording and updating in the inventory the information related to the monitored memory allocations and deallocations of objects in the software system, necessary for implementing the partitioning scheme.

26. The method according to claim 18, wherein the triggering event comprises any one of a program exception and a dump request.

27. An apparatus for dumping partitioned memory in a software system, comprising an analyzer for analyzing dumped information, and for generating a new memory partitioning scheme based on results of the analysis;
   a monitor for, during execution of the software system, monitoring memory allocations and deallocations of objects in the software system and according to results of the monitoring, assigning the allocated objects in the software system into corresponding memory partitions, wherein a memory space of the software system is partitioned according to a given partitioning scheme; and
   an event detector for detecting a triggering event of memory dump; and
      a dumper for dumping related memory partitions according to the detected triggering event of memory dump,
   wherein the memory space of the software system is partitioned according to the new partitioning scheme; and
   wherein the event detector is implemented on a processor.

28. The apparatus according to claim 27, further comprising a scheme parser for obtaining the partitioning scheme, and for parsing the partitioning scheme; and
   a partitioner is configured to partition the memory space of the software system based on results of the parsing.

29. The apparatus according to claim 27, wherein the memory partitions are real memory partitions.

30. The apparatus according to claim 27, wherein the memory partitions are logical memory partitions.

31. The apparatus according to claim 30, wherein the monitor is further configured to:
   record and update in an inventory information related to the monitored memory allocations and deallocations of objects in the software system; and
   assign the allocated objects in the software system to logical memory partitions according to the information as recorded in the inventory.

32. The apparatus according to claim 31, wherein the monitor is further configured to:
   record and update in the inventory the information related to the memory allocations and deallocations of objects in the software system, necessary for implementing the partitioning scheme.

33. The apparatus according to claim 27, wherein the triggering event comprises any of a program exception and a dump request.

34. A computer readable article of manufacture tangibly embodying non-transitory computer readable instructions which, when executed, cause a computer to carry out the steps of a method for dumping partitioned memory in a software system is partitioned according to a given partitioning scheme;
   during execution of the software system, monitoring memory allocations and deallocations of objects in the software system, wherein a momory space of the software system, comprising the steps of:
   according to results of the monitoring, assigning the allocated objects in the software system into corresponding memory partitions;
   detecting a triggering event of memory dump;
   dumping related memory partitions according to the detected triggering event of memory dump;
   analyzing dumped information; and
   generating a new triggering event of memory dump based on results of the analysis,
   wherein the step of detecting the triggering event of memory dump comprises detecting the new triggering event of memory dump.

35. A computer readable article of manufacture tangibly embodying non-transitory computer readable instructions which, when executed, cause a computer to carry out the steps of a method for dumping partitioned memory in a software system, comprising the steps of:
   during execution of the software system, monitoring memory allocations and deallocations of objects in the software system, wherein a memory space of the software system is partitioned according to a given partitioning scheme;
   according to results of the monitoring, assigning the allocated objects in the software system into corresponding memory partitions;
   detecting a triggering event of memory dump;
   dumping related memory partitions according to the detected triggering event of memory dump;
   analyzing dumped information; and
   generating a new partition scheme based on results of the analysis;
   wherein the memory space of the software system is partitioned according to the new partitioning scheme.

* * * * *